Patented Apr. 20, 1943

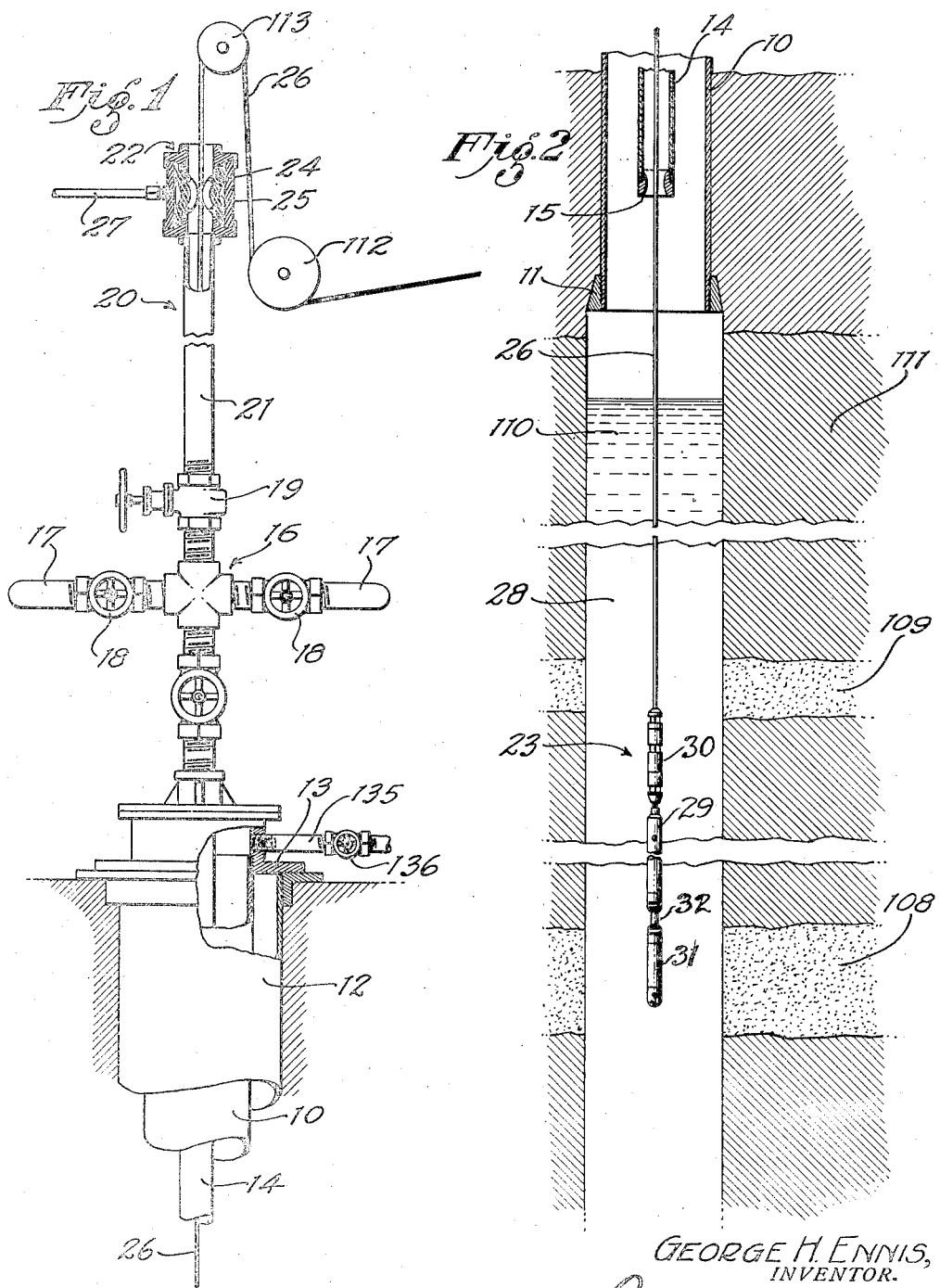

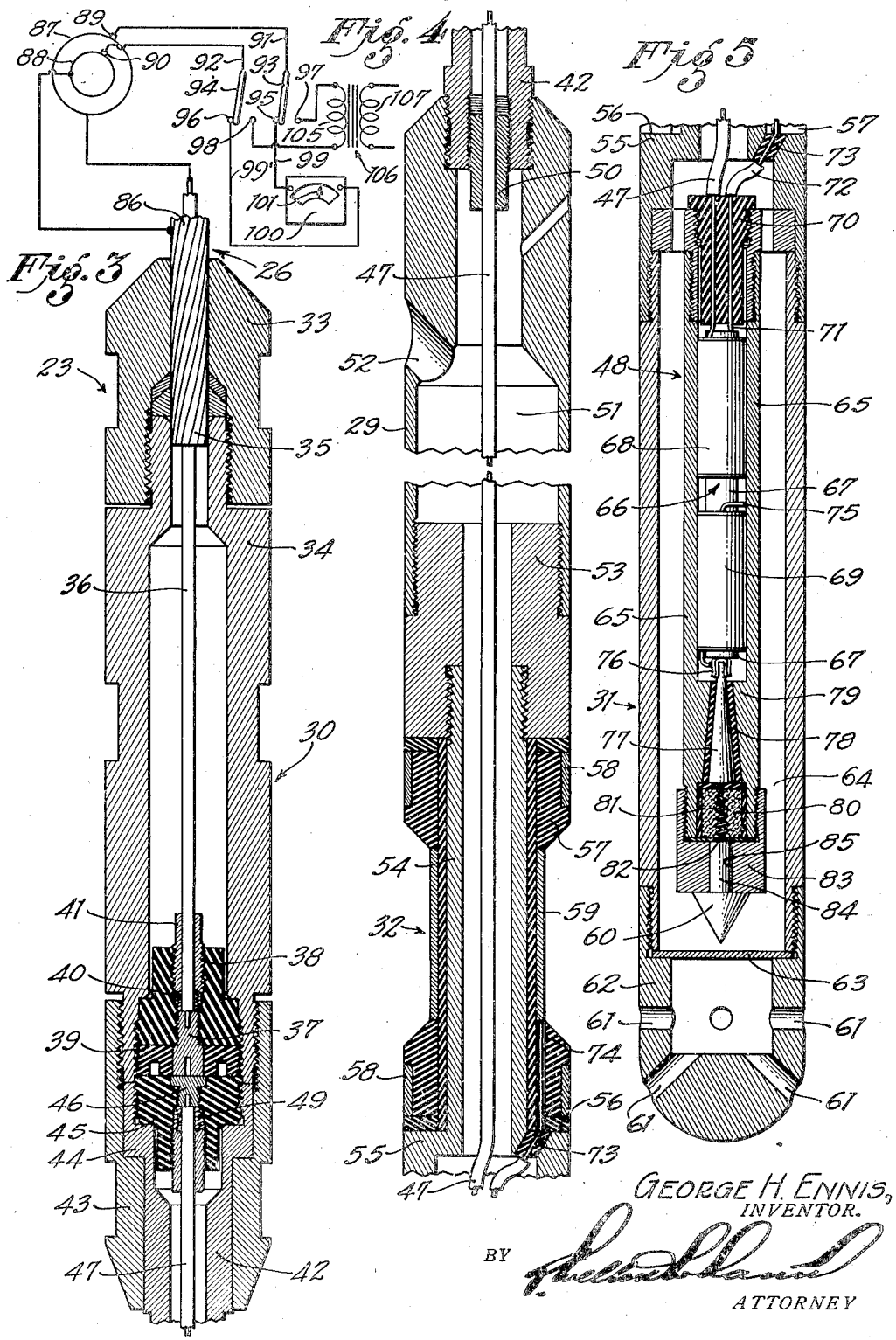

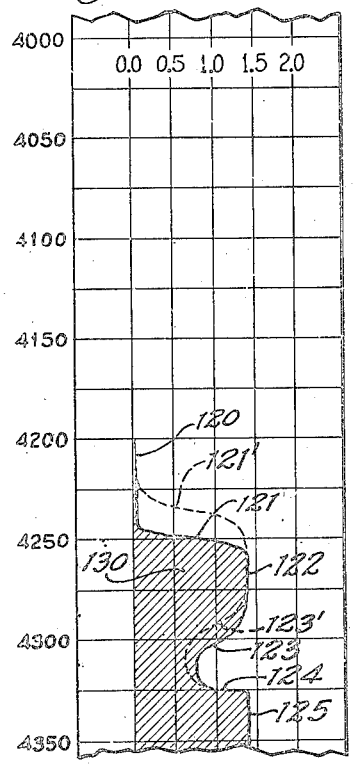
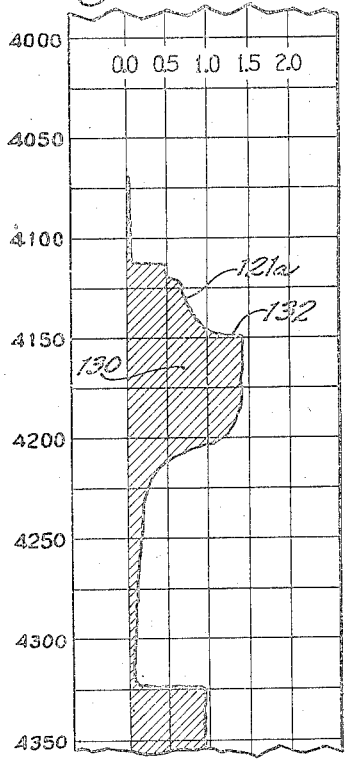
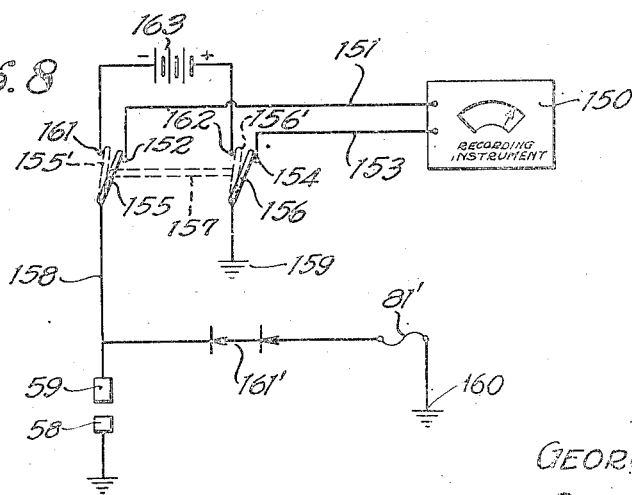

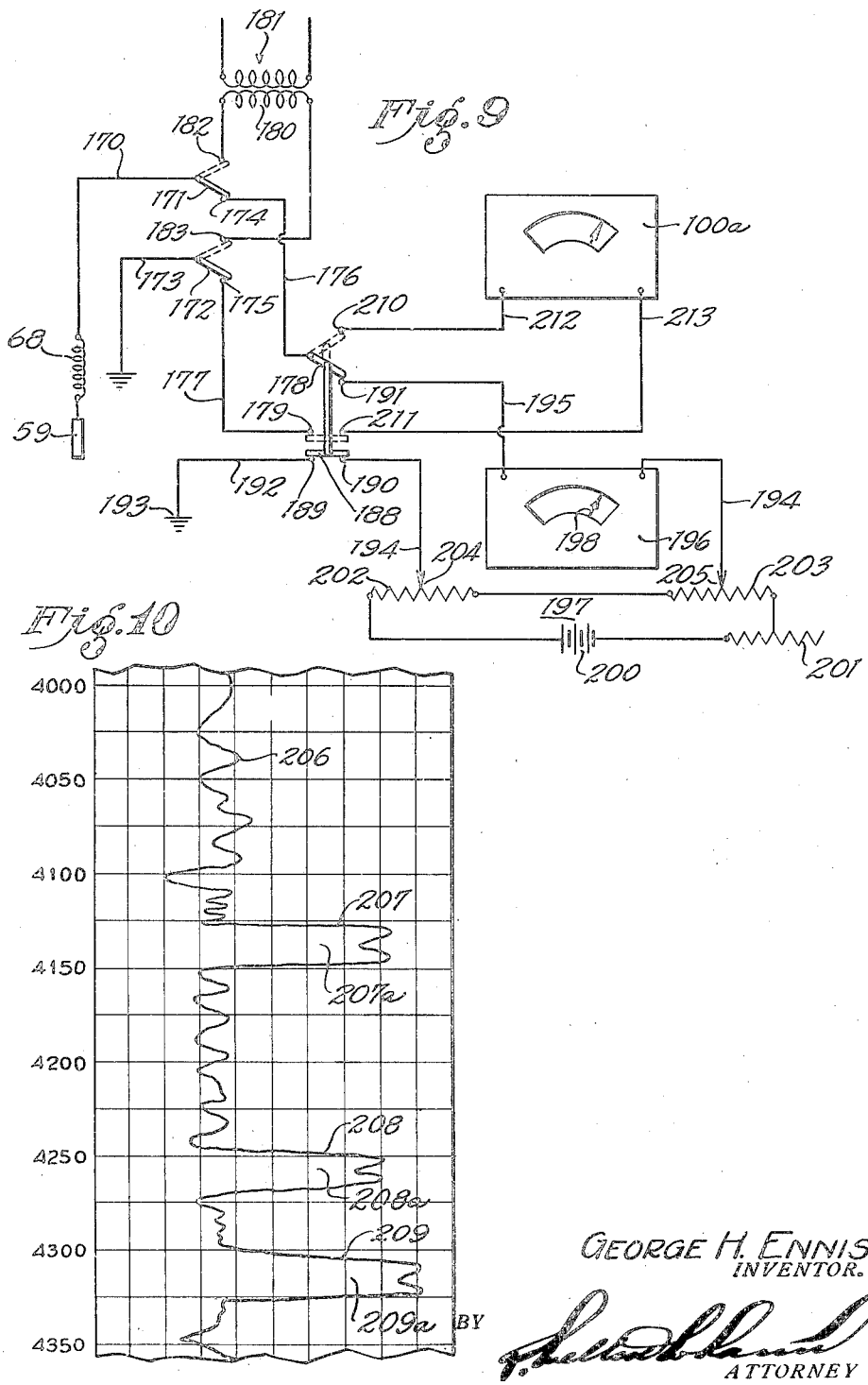

2,317,039

UNITED STATES PATENT OFFICE 2,317,039

METHOD AND APPARATUS FOR DETERMINING WATER LEAKAGES INTO WELLS

George H. Ennis, Long Beach, Calif., assignor of one-half to Robert V. Funk, Long Beach, Calif.

Application September 25, 1939, Serial No. 296,449

12 Claims. (Cl. 175—182)

My invention relates to a method and apparatus for testing a well for entry and movement of fluids therein, and relates in particular to a method and apparatus especially adapted for, but not limited to, the testing of wells referred to as flowing wells in contradistinction to pumping wells.

It is an object of the invention to make possible the ready and reliable testing of wells of this type without necessity of first "killing" the well, as has been the general previous practice in the testing of flowing wells to determine points of entry of fluid thereinto. Accordingly, the invention makes possible the testing of a well without the necessity of pumping a weighted material such as drilling mud or a mixture of mud with a heavy weighting material into the well to stop the flow from the formation and to then fill that portion of the hole which is to be tested with a mud conditioned for the purpose of making a test. The old method of testing wells of this type has required from four to eight days to prepare for and complete the testing operations whereas my present invention makes it possible to test a well of the same character in from two to eight hours time.

It is an object of the present invention to provide a method and apparatus whereby a test may be conducted in a well while there is movement of fluid therein. Accordingly, the practice of the present invention does not require the prohibition of entry of fluids into the well during the time the well is being conditioned for the test nor during the actual performance of the testing steps. A feature of this invention is that it likewise makes possible the determination of volumes of fluid entry at different points by reference to rate of travel of the fluid from one point to another in the well, and makes possible the determination of the direction and rate of flow of fluids in a well for example the flow of water in from one formation to and out into another formation may be readily determined in a flowing well. We have found a number of instances where water has entered the well from a high pressure stratum passed from the well into a lower pressure stratum.

It is a further object of the invention to provide a method of testing within a well wherein a conditioning substance is first deposited or distributed in a selected zone in the well and a test is thereafter immediately conducted without the necessity of first withdrawing from the well the delivery device or distributor employed in placing the conditioning material in the well. Accordingly, it is a further object of the invention to provide a well testing device comprising a delivery means for distributing a conditioning material in the well and a testing device for determining variations in the characteristics of the fluid in the well, which testing device may be moved from one position to another in the well without necessity of removing the delivery device from the well.

A further object of the invention is to provide a method especially adapted for use in flowing wells wherein the probable or expected point of entry of water is first determined by a simple preliminary test. A means for obtaining this preliminary observation includes an electrical test of the formation penetrated by the well to determine positions of water sand from which an entry of water into the well might be reasonably expected, this original observation serving as a guide for the placement of the conditioning material, and therefore greatly expedites the making of the complete well test.

A further object of the invention is to provide an improved method of determining zones of water entry into a well wherein a test of the fluid content of the well is correlated with information obtained from a formation test, the information obtained from the curves of these two types of tests serving not only to show the approximate position of the zones from which the water is entering, but also to accurately define the upper and lower limits of this zone.

A further object of the invention is to provide a device having a well conditioning member and a testing element connected so that they may be moved simultaneously within the well and having means extending to the top of the well whereby their movement in the well may be controlled or produced.

It is a further object of the invention to provide a combined delivery and testing device having a hollow body forming a chamber for a conditioning substance and a testing element connecting to the body so as to be moved therewith in the well by means of a suspending cable, the cable carrying or providing conductors for electrical connection with the test element and for electrical connection with a means associated with the chamber whereby the emission of the conditioning material from the chamber may be accomplished.

A further object is to provide a combined delivery and testing device comprising a chamber for a substance to be delivered into the well, this chamber having an electrically controlled means for effectuating the delivery of the substance into the well, and a testing element connected to the device so as to move therewith from one point to another of the well, this testing element having connection with recording or indicating instruments disposed at the top of the well whereby an observer may have knowledge of the operation of the testing element. In the preferred practice of the invention the testing element is of the electro-chemical type where the well is to be tested for entry of water. It will be perceived, however, that this testing element may consist of any one of a number of testing means which have been proposed for the making of tests of fluid in the well, for example, resistance, capacitance, viscometric, and thermometric. A form of testing element especially adapted for use in the practice of the present invention is that of the photo-electric type whereby the opacity or light transmitting qualities of the fluid in the well are measured and compared. Where this type of testing element is employed, the conditioning material delivered by the device could be a dye or other substance effecting the light transmitting or reflecting qualities of water in the well, and under another condition of use the conditioning substance might be a transparent or translucent fluid such as water or oil. It will be understood that a transparent or translucent fluid would be employed as a conditioner where it is desired to determine the point of entry of oil into a column ordinarily substantially filled with oil, an emulsion, or mud. In this instance the translucent or transparent fluid would be applied so as to displace a portion of the contents of a well and photoelectric tests would be immediately conducted along the extent of the deposited fluid to note or seek changes therein indicating the entry of a dark substance from the formation.

It is a further object of the invention to provide a device of the above character wherein the means for effectuating delivery of the conditioning substance from the chamber thereof is accomplished by the use of an ignitable substance which may be an explosive.

A further object is to provide a device for delivery of a substance to a submerged point in a well having a means for effectuating a delivery of the substance from a chamber, which means is controlled or actuated by ignition of a material.

A further object of the invention is to provide a device for delivery of a substance at a submerged point within a well having means for effectuating release of the substance, which means is actuated or controlled as the result of ignition of a material through application of an electrical current controlled by an operator positioned outside the well, for example, at the upper end thereof.

A further object is to provide a device to be lowered into a well, comprising a body having a chamber connecting with the exterior through an opening, a wall closing this opening, and explosive means for rupturing this wall so that a flow through the opening may occur.

Further objects and advantages of my invention will be brought out in the following part of the specification.

Referring to the drawings which are for illustrative purposes only:

Fig. 1 is a view showing the upper end of a well equipped for the making of a test.

Fig. 2 is a cross-section showing a lower portion of the well with the testing device suspended therein.

Fig. 3 is an enlarged cross-sectional view of the cable head forming a part of the combined delivery and testing device.

Fig. 4 is an enlarged cross-section of the upper portion and testing element of the combined delivery and testing device.

Fig. 5 is an enlarged sectional view of the lower portion of the combined delivery and testing device.

Fig. 6 is a graph of a test taken in a zone in the well immediately after the distribution of the conditioning substance therein.

Fig. 7 is a graph of a test made in the same zone a short time later.

Fig. 8 is a diagram showing a means whereby direct current may be employed for ignition of the explosive for releasing the conditioning substance.

Fig. 9 is a diagram showing an arrangement of elements which I may employ in the making of correlated tests of the fluid content and the formation of a well.

Fig. 10 is a curve representing changes in formation of the well shown in Fig. 2.

In Figs. 1 and 2 I show a casing 10, having a shoe 11 at the lower end thereof. This casing 10 may be suspended within a larger casing 12 by means of a casing head 13 which also supports an oil tube 14 which projects down within the casing 10 to a point near the lower end thereof and has a throat 15 at or near its lower end. The upper end of the oil tube is connected to a christmas tree 16 including oil delivery pipes 17 provided with valves 18. Projecting upwardly from a valve 19 in alignment with the tube 14 a lock 20 is mounted, this lock being sometimes referred to as a lubricator and consisting of a length of pipe 21 with a control head 22 at the upper end thereof. This pipe 21 being of such length that the combined delivery and testing device 23, shown in Fig. 2, may be lowered thereinto through the control head 22 when the valve 19 is closed off against the well pressure. This control head has a rubber wall 24 surrounded by a fluid chamber 25. When fluid is pumped into the chamber 25 through a pipe 27, the rubber wall will be forced radially inward so as to be constricted around the cable 26 which extends therethrough for the purpose of supporting and lowering or raising the device 23. After the rubber member 24 has been constricted so as to seal around the cable, the gate 19 may be opened so that the device 23 may be lowered through the tubing 14 into the lower portion 28 of the well lying below the shoe 11 of the casing 10.

As shown in Fig. 2, the device 23 is of small diameter so that it will pass through the throat 15. Ordinarily this device 23 has an external diameter of one and three-quarter inches and a length of about 37 to 40 feet. It comprises a relatively long upper section 29 which is connected to the cable 26 by means of a cable head 30, and a lower section 31 spaced from the upper section 29 by a testing element 32. As shown in Fig. 3, the cable 26 is led into a cable socket 33 which is threaded on the upper end of a sleeve 34. From the end 35 of the cable which is locked in the socket 33, an insulated conductor 36 is extended down to a contact 37 which threads into an insulator bushing 38 which is held in the lower end of the sleeve 34 by means of a threaded ring 39 of insulating material. Above the contact 37 the insulator bushing 38 is provided with a gland 40 compressed around the insulation of the conductor 36 by means of a gland nut 41. The cable head is detachably connected to the upper end of the upper section 29 by means of a union comprising a hollow member 42 which threads into the upper end of the member 29 and a shouldered sleeve 43 which forces a head 44 on the upper end of the member 42 against the lower end of the member 34 of the cable head 30. The head 44 carries an insulator 45 which holds a contact 46 in position for engagement with the contact 37 when the parts are secured together, as shown in Fig. 3. From this contact 46 an insulated conductor 47 extends, as shown in Figs. 4 and 5, down through the hollow member 42 and thence down through the upper section 29 and the testing element 32 to an electro-responsive device 48 situated in the lower section 31. Below the contact 46, the insulator 45 is provided with a gland 49 for sealing around the upper end of the conductor 47, and a guide 50 for the conductor is threaded into the lower end of the tubular member 42. The upper section 29 has a chamber 51 with a small opening 52 leading into its upper end. At the lower end of the section 29 there is a bushing 53 into which the upper end of a tubular wall 54 is screwed. This tubular member 54 has a cylindrical enlargement 55 which threads on to the upper end of the lower section 31, as shown in Fig. 5, and provides a shoulder 56 for forcing the testing element 32, which surrounds the tube 54, against the lower end of the bushing 53.

The testing element 32 comprises a spool 57 of insulating material, the ends of this spool each supporting a half of a divided metal electrode 58 thereon, and the throat of the spool 57 having a cylindrical sleeve 59 forming a second electrode. These electrodes are of such metals as to cooperate in forming a galvanic cell when immersed in an electrolyte. In the general use of the invention I find that satisfactory results may be obtained by the use of zinc for the electrode 58 and an alloy of gold and silver for the element 59.

The electro-responsive device in the lower section 31, Fig. 5, controls the actuation of a member 60 adapted to effectuate the passage of fluid through openings 61 in a cap 62 which is secured to and forms a part of the lower section 31. In the preferred practice of the invention a disc 63 is placed between the cap 62 and the lower end of the member 31 so as to provide a diaphragm or obstructing wall and the member 60 preferably constitutes a projectile which may be caused to rupture, shatter, or penetrate the wall 63 so that there will be a direct communication between the space 64 and the openings 61.

The electro-responsive device 48 is somewhat diagrammatically shown as comprising a tubular shell 65 in which a transformer 66 is supported. This transformer has a core 67 on which primary and secondary windings 68 and 69 are formed. The conductor 47 which passes down through the tubular member 54 is carried through a suitable sealing means 70 disposed at the upper end of the tubular shell 65 and is connected to one end of the primary winding 68. The remaining end 71 of the primary winding 68 is brought out through the sealing means 70 and by means of a conductor 72 is connected with the sleeve electrode 59. The conductor 72 is carried through a small insulator 73 mounted in the wall of the enlargement 55 and passes from this insulator 73 through an opening 74 in the lower head of the spool 57. One end of the winding 69 is connected by means of a ground 75 with the tubular shell 65 of the electro-responsive device 48. The remaining end of the winding 69 is connected to a spring contact 76 mounted on the lower end of the transformer core 67, for engagement with the upper end of an insertable taper pin 77 which is passed upward through a tapering opening in a tapered insulator bushing 78 supported by means of a wall 79 near the lower end of the shell 65. Below the bushing 78 there is a powder chamber 80 to receive a charge of powder through which an igniting element 81 comprising a fine strand of resistance wire is extended to a thin metal plate 82 held in place against the lower end of the shell 65 so as to be grounded against the lower end of the shell 65. A cap 83 is threaded on to the lower end of a shell 65 for the purpose of holding the metal wall 82 in place and for the further purpose of supporting the projectile 60 which has a stem 84 projecting upward into an opening 85 in the cap 83. Both of the zinc electrodes 58 are grounded with the metal shell of the device 23 so as to have electrical connection with the sheath 86 of the cable 26.

As shown in Fig. 3 the conductor 36 may be connected to a commutation ring 87 and the cable sheath 86 may be connected to a commutator ring 88, both of these rings being mounted on the cable drum on which the cable is wound. Brushes 89 and 90 engage the rings 87 and 88 and are connected through conductors 91 and 92 with switch members 93 and 94 adapted to be swung from responsive engagement with contacts 95 and 96 to engagement with contacts 97 and 98. The contacts 95 and 96 are connected through wires 99 and 99' with an electro-responsive indicating device 100 constituting a millivolt meter. The contacts 97 and 98 are connected to the secondary 105 of an A. C. transformer 106 having a primary winding 107.

When the device 23 is lowered into an electrolyte, the electrodes 58 and 59 form a galvanic cell generating a potential which may be measured by the indicating device of meter 100 together with such changes as may be caused by polarization of the cathode 59. In the general practice of the invention the aqueous solution is produced in the well by distributing throughout a select portion of water in the well a suitable conditioning material. This conditioning material in the preferred practice of the invention is a solution of sodium bichromate and sulphuric acid. When the water in the well is first conditioned a voltage will be generated by the testing element 32 near to the maximum voltage characteristic of the electro-chemical qualities of the electrodes 58 and 59 in the prescribed aqueous solution in the well. As the solution is diluted there will be a slow drop-off in the potential produced by the testing element 32, and when the dilution approaches 90% there will be a rapid drop in the potential generated between the electrodes 58 and 59.

In one use of the device the following method may be employed: The upper and lower chambers 51 and 64 of the device 23 are filled through the opening 52 after the assembly of the parts previously described, that is to say, with the disc 63 in place and with the bullet 60 and explosive installed in operative position thereabove. If the pressure under which the well is operating is not great, the device 23 may be lowered into the lock 20 and after actuation of the control head 22 the gate 19 may be opened and the device 23 lowered through the christmas tree and the tubing 14 into the lower part of the well to a position such as shown in Fig. 2. For the purpose of illustration, a lower water sand 108 and an upper water sand 109 are shown, both of which are feeding water into the bottom part of the well so that the well is filled with water 110 below the oil producing stratum 111. The device 23 is lowered to the bottom of the well or to a point near the bottom of the well, the distance of travel thereof being determined by means of a measuring sheave 112 under which the cable is passed, as shown in Fig. 1, to an upper supporting sheave 113 disposed above the christmas tree 16. While there is a movement or flow of fluid in the well, a portion of the water near the bottom of the well is conditioned by distributing the contents of the chambers 51 and 64 therein. To accomplish this the preferred practice is to lower the device 23 to the lower end of the zone in which the distribution of conditioning fluid is to be made, in this instance to the bottom of the well. The switch members 93 and 94 are then swung from their positions in Fig. 3 into engagement with the contacts 97 and 98 whereupon an alternating current may be fed through the primary winding 68 of the transformer 66. This will induce an alternating current in the secondary winding 69 which is connected in circuit with the filament 81 which due to the passage of the current therethrough becomes immediately heated and ignites the powder charge in the chamber 80 with the result that the bullet 60 is propelled downward so as to rupture the disc 63 thereby permitting the conditioning fluid to flow out through the openings 61 into the water in the well as the device 23 is raised at a suitable rate, for example, approximately 100 to 150 feet per minute as selected by the operator in accordance with his understanding of the diameter of the hole having therein the water to be conditioned.

After the discharge of the projectile 60, the device 23 is pulled upward as previously described. Knowing the approximate rate of discharge of the conditioning solution from the device, the operator will stop the device in a position spaced above the level at which he expects that the chambers of the device 23 will have been emptied. For example, the device 23 may be of such capacity, as to hold sufficient conditioning fluid for approximately 75 to 100 feet of well water. The operator may raise the device to a point 150 feet from the bottom of the well which, as indicated in chart, Fig. 6, is at a distance of 4350 feet from the surface. He will then immediately swing the switch members 93 and 94 back into engagement with the contacts 95 and 96 and will lower the device 23 gradually. Assuming that he has started down from the 4200 foot level, indicated in Fig. 6, he will first obtain a reading 120 of zero or near zero voltage depending upon whether the water in the well above the conditioned portion of the well is substantially pure or has a salt content. As the testing element 32 enters the conditioned fluid in its downward travel the potential registered by the meter will immediately rise to a point near maximum. For example, there will be an abrupt rise at 121 to approximately 1.4 volts, and as the device is continued downward, the reading as indicated at 122 will remain near maximum until a point of dilution is indicated by a drop-off 123 in the reading. This drop-off 123 will indicate the entry of water into the conditioned contents of the well. When the testing element 32 reaches and passes the point of entry of the water, there will be a rise 124 to a point near maximum, and if there is no lower point of water entry into the well the section 125 of the reading will remain at the point near maximum all the way to bottom. The reading thus taken indicates that the lower point of the water entry is at the 4325 foot level.

The upper point of this water entry is, of course, not known at the time of making the initial test for the reason that there has been a continuous upward movement of water from the point of entry from the time of depositing the conditioning solution to the time of return of the device 23 from the 4200 foot level to the zone of water entry which has its lower plane at the 4325 ft. level. The upper level of the zone of the water inlet 108 may be readily approximated however by checking the rate of rise of the drop-off 123 and then computing the initial position of the drop-off 123 at a time just following the distribution of the conditioning material in the portion of the well between the 4300 and 4325 foot levels. With relation to the foregoing it will be understood that as the water continues to flow into the well from the source 108, the body of conditioned fluid above the 4325 foot level, indicated by the cross-sectioned area 130 of Fig. 6, will be gradually displaced upward as indicated by dotted lines 123' and 121'. The upward movement of this body of conditioned water may be traced by consecutive readings obtained by use of the testing element 32 and the associated meter 100, and should this upwardly moving body of conditioned water encounter a further entry of formation water, for example, from the sand 109, the curve obtained will indicate the same. By reference to Fig. 6 it will be noted that the rise 121 in the curve is relatively abrupt, indicating that when the testing element 32 is lowered from the fresh water in the upper part of the well into the conditioned fluid, it has encountered a rapid change or increase in the strength of the solution. When the upward moving body of conditioned solution 130 reaches the plane at which water is entering from the sand 109 there will be a dilution of the solution causing the rise 121 to have a stepped form as shown at 121a in Fig. 7, the shoulder 132 indicating the approximate position of the lower plane of the entry of water from the sand 109 as being approximately at the level of 4148 feet below the surface.

To check on this latter indication of the entry of water at about the 4148 foot level, a new test may be made or the first test hereinabove described may be supplemented, in the following manner. The device 23 is pulled from the well and recharged with conditioning solution. It is then lowered to the 4200 foot level, and while being moved upward to the 4100 foot level will be caused to discharge the conditioning fluid. The device 23 will then be immediately lowered so that the testing element 32 will traverse the distance between 4100 feet and 4200 feet to obtain a reading from the meter 100 which will be similar to that shown in Fig. 6 but which will have a drop-off and rise occasioned by the dilution of the conditioned well water caused by entry of formation water from the sand 109.

It will be understood that the foregoing determinations have been made while well fluids have been moving upward in the well from their point of entry and without the necessity of cutting off of all production from the top of the well, nor the loss of time which would be occasioned in attempting to bring the well to a static condition by completely closing the upper end thereof. Such closing of the upper end of the well would ordinarily be inadvisable for the reason that in a flowing well the fluids enter from formations under different pressures, and unless a somewhat normal flow is permitted, the backing up of these pressures will result in the higher pressure from one formation causing a reverse flow of fluid into another formation. Likewise, the accumulation of gas in the upper part of the well will at times cause a pressure build up which will result in reverse flows into low pressure formations. From the foregoing it will be perceived that tests made after killing the production of a well could not be depended upon as being entirely reliable; whereas, tests made in the well while there is an upward flow of fluid therein in accordance with my present invention, are entirely reliable.

There are many variations of the practice of the method, as will be hereinafter indicated, to adapt the same to the various conditions which may be encountered. For example, if the well in which the test is to be made is flowing under very high pressure, it may be necessary to pump a weighted material, such as mud, into the upper part of the oil tube to offset a portion of the pressure which is acting upward through the oil tube against the seal formed by the control head 22. Under such circumstances the well may be permitted to produce through the upper end of a casing 10, a pipe 135 and valve 136 being shown connected to the casing head 13 for this purpose. In many instances it is found desirable to materially reduce the flow from the well by closing down on the outlet valve so that the upward movement of fluids in the well may be reduced to a reasonable extent. In some instances, I may take advantage of the fact that even after the valves at the top of the well are completely closed there continues to be a flow of fluids into the well from the formation, since the upper part of the casing 10 is ordinarily occupied by gas, which is compressible so that there may be an upward movement of liquid in the well until such time as the gas pressure in the well balances the pressure of entering fluid. In many wells a dormant condition of the fluid therein is not reached until after the valves have been closed down for a period of six to eight hours, and even at such time there may continue to be a flow of fluid from a high pressure formation into a lower pressure formation. Accordingly, I prefer to test a well of the flowing type without entirely shutting off the flow from the upper end thereof, or during a short period of time immediately after the valves are closed, for the reason that during this short period of time after the closing of the valves, there is still an upward movement of fluid from the formation into the well.

In Fig. 8 I show an arrangement wherein the means for effectuating the delivery of the conditioning material into the well is accomplished through use of a direct current. Herein a recording or indicating instrument 150 is connected through a conductor 151 with a switch contact 152. Another conductor 153 is carried to a switch contact 154. A throw-over switch is provided having switch members 155 and 156 which are linked together as indicated at 157 so that when switch member 155 is in engagement with the contact 152, switch member 156 will be in engagement with contact 154. A conductor 158 is carried down through the cable 26 to the gold electrode 59 in the combined delivery and testing device 23, the zinc electrode 58 being grounded with the cable. The switch member 156 is connected through a ground 159 with the cable 26. When the switch members 155 and 156 are in the positions in which they are shown in full lines in Fig. 7, the immersion of the electrodes 58 and 59 in an electrolyte will produce a potential which will be recorded or indicated by the instrument 150.

The actuating means for effecting the opening of the passages which connects the interior of the device 23 with the exterior is shown as a filament or fuse 81', one side of which is grounded as indicated at 160, and the other side of which is connected through rectifiers 161' with the conductor 158. Contacts 161 and 162 are disposed so as to be engaged by the switch members 155 and 156 when such switch members are moved into the positions indicated by dotted lines 155' and 156'. A battery or other source of direct current 163 is connected to the contacts 161 and 162 so that positive current will be fed through the switch member 156 and the ground connection 159 and 160, through the filament or fuse 81', the rectifiers 161', the conductor 158, and the switch member 156 to the negative pole of the battery 163, thereby electrifying the member 81' to effectuate discharge of the conditioning material. Immediately thereafter the switch members 155 and 156 may be returned to their engagement with the contacts 152 and 154 so that as soon as the conditioning material is distributed in the well the electrodes 58 and 59 and the instrument 150 may be employed to test the conditioned fluid in the well.

In one practice of the invention I employ a preliminary test to determine the probable point of entry of water into the well and in some instances may employ a pressure recording device by which to indicate the level at which water is standing in the well. If the well being tested is in a field wherein other wells have been cored by the electrical method, the first test of my present invention is to make the formation test to determine the position of sand and shale, the information thereby obtained serving as a guide in making the remainder of the water entry test in a manner such as heretofore described. In Fig. 9 I diagrammatically show the apparatus by which this extended practice of my method may be performed.

Therein a conductor 170 is connected to the gold alloy electrode 59 of the device 23 and to a movable switch member 171. A switch member 172 is connected to a conductor 173 with the cable sheath 86. When the switch members 171 and 172 are in engagement with contacts 174 and 175, they will be respectively connected to conductors 176 and 177 with a switch member 178 and a contact 179. When the switch members 171 and 172 are in the alternate positions thereof indicated by dotted lines they will be connected with the secondary 180 of a transformer 181 by reason of their engagement with contacts 182 and 183, this latter position of the switch members 171 and 172 being employed when it is desired to transmit an alternating current to the device 23 in the well to effectuate delivery of the conditioning material.

The movable switch member 178 is linked to a switch member 188 which is adapted to engage contacts 189 and 190 when the switch member 178 is in engagement with a contact 191, as shown in full lines in Fig. 9. From the contact 189 a conductor 192 is carried to a ground 193 which may be connected to the well casing or directly to the soil. The contacts 190 and 191 are connected by conductors 194 and 195 with a microvoltmeter 196, the conductor 194 having a potentiometer balancing device 197 in series therewith to balance the potential effective in the circuit to the meter to such extent that the needle 198 thereof may be brought to a centralized position. The balancing device 197 consists of a battery 200 connected to a variable resistor 201 with series resistance element 202 and 203 engaged respectively by movable brushes 204 and 205 which have series connections with the conductor 194.

With the switch members 171, 172, 178 and 188 in the positions in which they are shown in full lines in Fig. 9, the device 23 is lowered into the well. As the device 23 passes through the successive strata, electro-potential variations will be impressed on the circuit which connects the electrode 59 with the ground member 193. In the operation of the device there will be a flow of current from the electrode 59 through conductor 170, switch member 171, conductor 176, switch member 178, conductor 195, meter 196, conductor 194, switch member 188 and conductor 192 to the ground member 193. In Fig. 10 I show a graph of the readings obtained while the device 23 is moved downward in the well shown in Fig. 2 from the 4000 foot level to the 4350 foot level. It will be understood that in the curve 206, thus plotted no attempt has been made to show the minor fluctuations of the needle 198. In accordance with the general principles of electrical well coring, set forth in my copending application, Serial No. 28,891, the rightward excursions 207, 208, and 209 may indicate sands, and since entry of water into a well is ordinarily from sand formation, the operator will seek entry of water from these sands. Accordingly, he will distribute conditioning material in zones in the well extending from points below to points above the sands and will conduct his tests in accordance with the general method previously described herein.

After release of the conditioning material from the device 23, which is accomplished by throwing the switch members 171 and 172 into engagement with the contacts 182 and 183 so as to supply the winding 68 of the transformer 66 with alternating current from the transformer 181, the switch members 178 and 188 are raised into the positions thereof indicated in dotted lines in Fig. 9 so that the switch member 178 will engage a contact 210 and the switch member 188 will engage the contact 179 and a contact 211, these contacts 210 and 211 being respectively connected through conductors 212 and 213 with a millivoltmeter 100a having the function of the voltmeter 100 shown in Fig. 3. Accordingly, tests of the concentration of the liquid in the well may be made with the device 23 as previously described.

An important feature of my method and apparatus concerns the ability to correlate a test of the fluid content of the well with a test of the formation of the well so that information obtained by the test of the fluid in the well may be verified or corrected by the information obtained from the test of the formation by the electrical coring method. According to the invention, the extended form of my device shown in Fig. 9 is employed to make tests of the fluid content of the well from which the information disclosed in the charts 6 and 7 is obtained and also a test of the formation to obtain the chart shown in Fig. 10. The sequence of these tests is not important, although in the general practice of the invention the formation test is first made, then the conditioning material is distributed and the tests of the fluid content are made. The curve 206 indicates sand in the positions 207a, 208a, and 209a of the rightward excursions 207, 208, and 209, but the charts 6 and 7 show that there is an entry of water only from the sands 207a and 209a, but not from the formation 208a. The chart, Fig. 10, shows the lower plane of the formation 209a at the 4325 foot level, which agrees with chart 5 wherein the rise 124 indicates entry of water at the point 4325 level. The upper plane of the formation 209a is shown to be at the 4305 level which indicates accordingly that the height of the water source represented by the formation 209a is 20 feet. Likewise the excursion 207 of the curve 206 checks the position of the point 132 of water entry in Fig. 7 as being at a level of substantially 4148 feet, and the excursion 207 shows the upper plane of the formation or in other words the upper point of water entry from the formation 207a as being substantially in the 4127 foot level below the surface of the ground. The foregoing method makes it possible in the testing of flowing wells, and especially those flowing wells in which the velocities of fluid are relatively high, to obtain accurate and reliable information concerning the entry of fluid into the well.

I claim as my invention:

1. A method of testing a well, in which there is a flow of fluid, for entry of water thereinto, comprising: making a test to determine the location of a body of water in the well; introducing a conditioning solution into said body of water; and immediately thereafter testing consecutive portions of said body of water.

2. In a device of the character described, whereby fluid in a well may be conditioned and immediately thereafter tested, the combination of: a hollow body providing a chamber for a conditioning material which is to be distributed in fluid in the well; means for causing discharge of said conditioning material from said chamber into the fluid in a selected portion of the well; testing means connected to said body so as to move therewith in the well, said testing means being operative to produce sensible indication of the changes in condition in the fluid in said portion of the well; and means for moving said body and said testing means in the well.

3. In a device of the character described, whereby the fluid in a well may be conditioned and immediately thereafter tested, the combination of: a hollow body forming a chamber to hold a conditioning material, said chamber having discharge valve means, means for actuating said valve means so that said conditioning material is discharged into a selected zone of the well; testing means connected to said body so as to move therewith in the well, said testing means being operative to produce sensible indication of the changes in condition in the fluid in said zone; and means operative to move said body and said testing means in the well.

4. In a device of the character described, whereby the fluid in a well may be conditioned and immediately thereafter tested, the combination of: electrically controlled fluid distributing means operative in a well to distribute a conditioning material in fluid in the well, there being conductors extending to the top of the well whereby delivery of fluid from said distributing means may be controlled; electrical testing means movable in the well during the time said fluid distributing means is in the well, operable to test the conditioned fluid in the well without necessity of removing said fluid distributing means from the well; and means comprising said conductors for transmitting from said testing means to the top of the well indications of the tests which may be noted by an observer.

5. In a device of the character described, to be lowered into a well, the combination of: a hollow body forming a chamber having an opening from the interior to the exterior; means for moving said body in the well; electrically controlled means for effectuating movement of fluid through said opening when said hollow body is in a desired position in the well; an electrical testing means movable in said well while said body is in the well; means forming an electrical circuit extending from said testing means to the top of the well; and a conductor to connect said circuit to said electrically controlled means whereby electrification may be transmitted to said electrically control means to actuate the same.

6. A method of the character described, for testing a well for entry of water thereinto, wherein a conditioning means and a testing device are employed, said conditioning means carrying a substance to condition the interior of the well, and said testing device having means for making observations of the contents of the well, comprising: lowering said conditioning means and said testing device into the well in such timed relation that they will be both in the well at the same time; delivering from said conditioning means into a selected zone in the well a quantity of said substance; and operating said testing device to make an observation of the contents of the well in said zone.

7. A method of the character described, for testing a well for entry of water thereinto, wherein a conditioning means and a testing device are employed, said conditioning means carrying a substance to condition the interior of the well, and said testing device having means for making observations of the contents of the well and for making an electrical formation test, comprising: lowering said conditioning means and said testing device into the well in such timed relation that they will be both in the well at the same time; making an electrical formation test by use of said testing device; delivering from said conditioning means into a selected zone in the well a quantity of said substance; and operating said testing device to make an observation of the contents of the well in said zone.

8. A method of the character described, for testing a well for entry of water thereinto, wherein a conditioning means and a testing device are employed, said conditioning means carrying a substance to condition the interior of the well, and said testing device having means for making observations of the contents of the well and for making an electrical formation test, comprising: lowering said conditioning means and said testing device into the well in such timed relation that they will be both in the well at the same time; making an electrical formation test by use of said testing device; delivering from said conditioning means into a selected zone in the well a quantity of said substance; operating said testing device to make an observation of the contents of the well in said zone; and correlating the data of both of said tests to define the point of entry of water into said well.

9. A method of the character described, for testing a well for entry of water thereinto, wherein a conditioning means and a testing device are employed, said testing device having means for making observations of the contents of the well, comprising: lowering said conditioning means and said testing device into the well in such timed relation that they will be both in the well at the same time; utilizing said conditioning means to condition a selected zone in the well; and operating said testing device to make an observation of the contents of the well in said zone.

10. In a method of testing a well in which there is a flow of fluid, the steps of: conditioning a selected portion of the well; and thereafter making consecutive observations of the fluid in said selected portion of the well by use of a testing device, whereby data concerning positions of moving and/or stationary portions of said fluid may be established.

11. In a method of testing a well in which there is a flow of fluid, the steps of: conditioning a selected portion of the well; thereafter making consecutive observations of the fluid in said selected portion of the well by use of a testing device, whereby information of the relative movement and relative positions of different portions of the fluid may be determined; and comparing the results of said consecutive observations to fix the position of the point of entry of fluid into said well.

12. In a method of testing a well in which there is a flow of fluid, the steps of: conditioning a selected portion of the well; thereafter making consecutive observations of the fluid in said selected portion of the well by use of a testing device; recording the relative positions and relative rates of flow of different portions of the fluid in said selected portion of said well, as shown by said consecutive observations; and correlating the data of the records thus obtained to determine the point of entry of fluid into the well.

GEORGE H. ENNIS.